United States Patent
Fueslein

[15] 3,650,333
[45] Mar. 21, 1972

[54] HINGE MECHANISM FOR FOLDING DISK HARROW GANGS

[72] Inventor: Jerome L. Fueslein, Stockton, Calif.
[73] Assignee: International Harvester Company, Chicago, Ill.
[22] Filed: Sept. 14, 1970
[21] Appl. No.: 71,775

[52] U.S. Cl.............................172/311, 172/456, 172/568, 280/411 A, 16/147
[51] Int. Cl................A01b 63/32, A01b 65/02, E05d 11/10
[58] Field of Search......................172/311, 456, 568; 16/145–147; 49/199; 244/49, 279, 291, 293, 298, 299; 182/22–23, 104, 158, 163; 280/411–413; 292/96, 127, 195, 201, 227; 274/307; 298/23

[56] References Cited

UNITED STATES PATENTS

| | | | |
|---|---|---|---|
| 1,404,544 | 1/1922 | Rettig | 172/456 |
| 2,260,080 | 10/1941 | Lane | 49/199 |
| 2,719,682 | 10/1955 | Handel | 244/49 |
| 3,247,990 | 4/1966 | Prescott | 292/201 |
| 3,272,552 | 9/1966 | Park | 288/23 MD |

Primary Examiner—Robert E. Pulfrey
Assistant Examiner—C. W. Hanor
Attorney—Floyd B. Harman

[57] ABSTRACT

Mechanism for folding the extension wings of a disk harrow utilizing a hydraulic cylinder connected to each wing section, wherein the connection between the cylinder and each of the wings provides maximum leverage throughout the extension and retraction strokes of the cylinder to swing the wing section between its operating position and its folded inoperative position.

12 Claims, 7 Drawing Figures

Patented March 21, 1972 3,650,333

INVENTOR
JEROME L. FUESLEIN
BY ATT'Y.

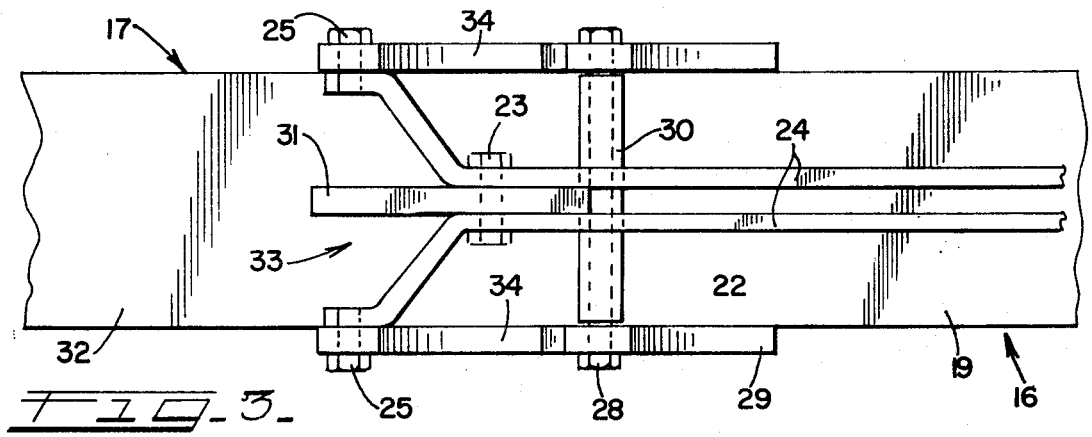
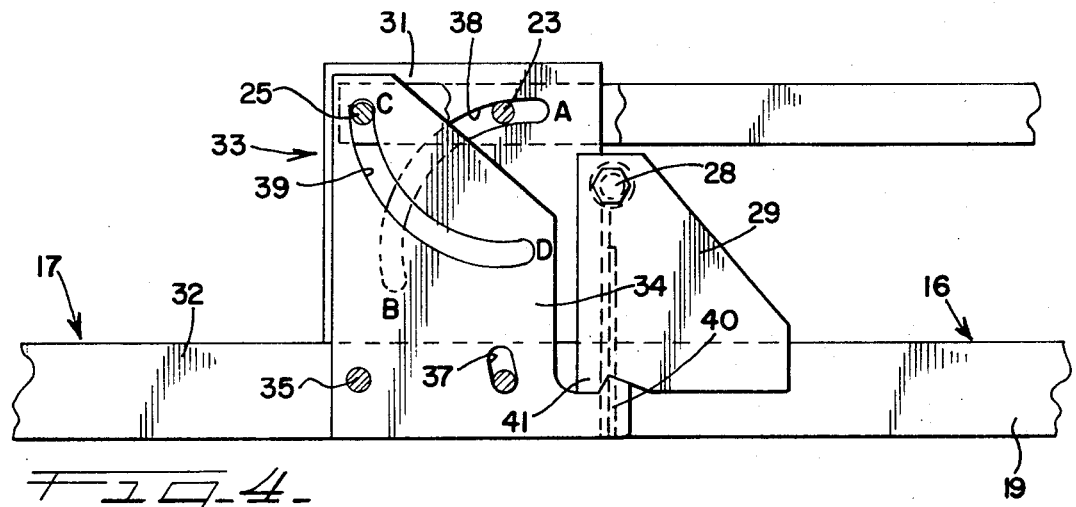
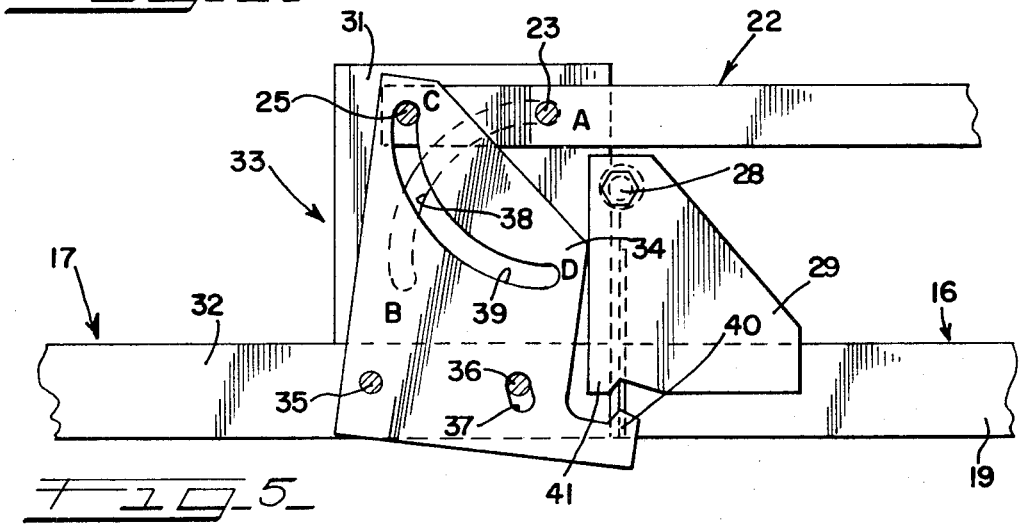
INVENTOR
JEROME L. FUESLEIN

INVENTOR
JEROME L. FUESLEIN 3,650,333

HINGE MECHANISM FOR FOLDING DISK HARROW GANGS

BACKGROUND OF THE INVENTION

This invention relates to folding wing implements, and particularly to disk harrows and the like. More specifically, the invention concerns improved means for folding and unfolding the extension wings of a disk harrow.

In the agricultural implement industry it is common practice to increase the width of an implement by adding wing sections to the ends of a conventional main or central section. The problem of transporting such implements over roads and through gates is solved by hinging the extension wing sections to the central section so that the wing sections can be folded to reduce the overall width of the implement.

In an implement such as a wheel controlled offset disk harrow where front and rear gangs converge at one side, the wing sections must be folded in a substantially vertical plane and must be swung through an arc of approximately 180° from a horizontal position in alignment with the central section to a folded position above and parallel to the central section. Moreover, the substantial weight of the wing section requires that the folding mechanism be of rugged construction providing substantial leverage and that the operations of folding for transport and unfolding for operation be controlled throughout the arc of travel of the wing sections. Therefore, an object of the present invention is the provision of improved apparatus for folding the wings of an implement.

Another object of the invention is the provision, in an implement such as a disk harrow having hinged extensions wings, of novel power operated means connected between the main and wing sections providing improved leverage throughout the arc of travel of the wing section from its extended operating position to its folded inoperative position.

Another object of the invention is the provision of extensible and retractable power transmission means for folding a hinged wing section upon a main implement section wherein the extensible and retractable means is separately connected to a pair of members on the wing section, and wherein thrust is imparted to one of said members to swing the wing section through the first half of its arc of travel and is transferred to the other member to swing the wing section through the remainder of said arc.

A further object of the invention is the provision, in a disk harrow having main and hinged wing sections, of a hydraulic cylinder mounted on the main section having extension and retraction strokes for alternately pivoting each wing section between extended operating and folded inoperative positions and latch means for locking the wing section to the main or central section and actuated by the first part of the stroke of the cylinder in one direction to release the latch prior to folding the wing, and by the last part of its return stroke to lock the wing to the central section.

DESCRIPTION OF THE DRAWINGS

FIG. 3 is a plan view of a portion of the structure of FIG. 2;

FIG. 4 is a sectional side elevation, with parts broken away, of the structure of FIG. 3, showing the relationship of parts when one of the wing sections is locked in its extended or operating position;

FIG. 5 is a view similar to FIG. 4, showing the position of the parts after the initial retraction stroke of the hydraulic power transmission mechanism has released the latch preparatory to folding the wing section;

DESCRIPTION OF THE PREFERRED EMBODIMENT

Figures 1, 2:
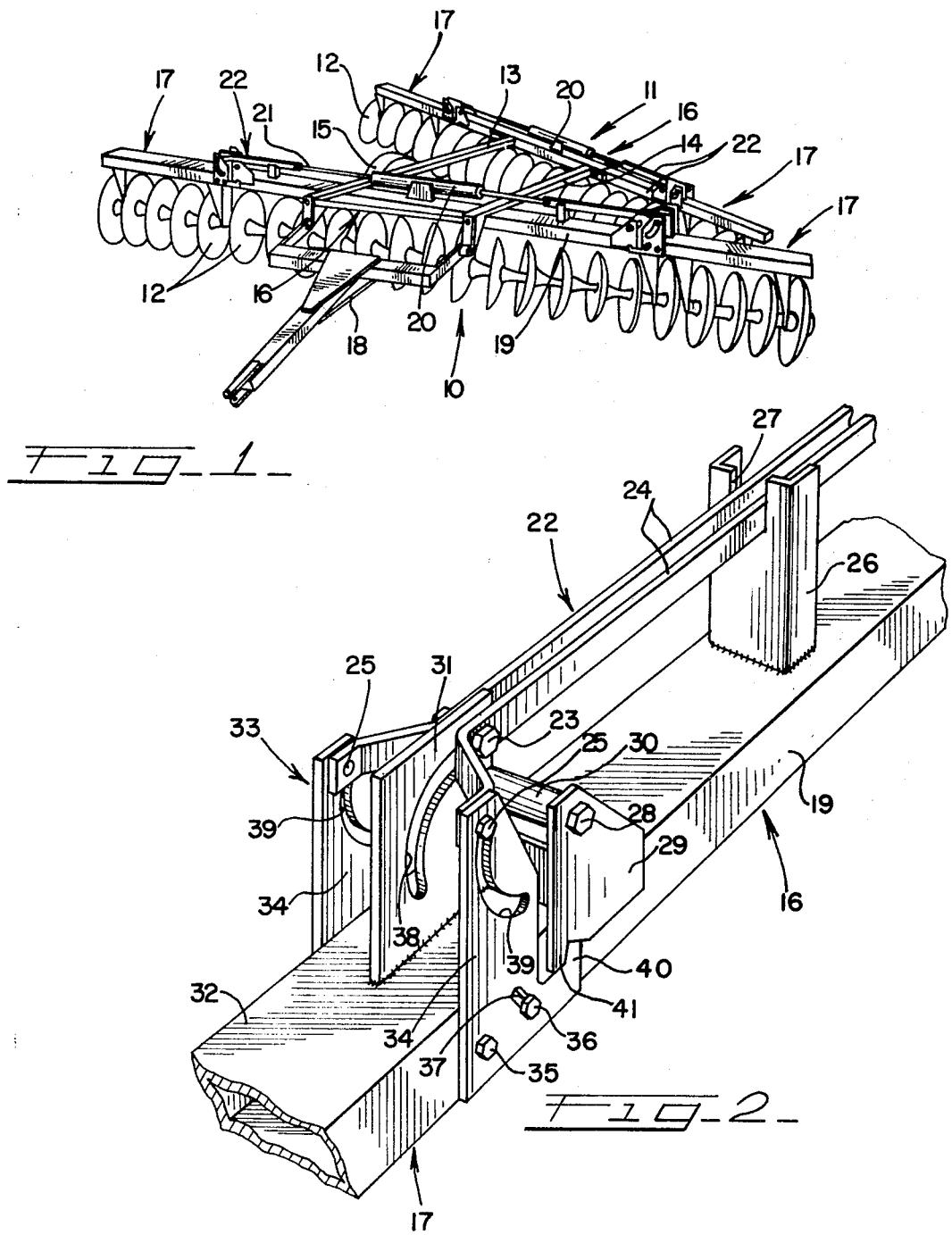
FIG. 1 is a perspective view, with parts removed, of a wheel controlled offset disk harrow having foldable extension wings controlled by means incorporating the features of this invention.
FIG. 2 is an enlarged detail in perspective of a portion of the structure shown in FIG. 1.

The implement shown and described herein is a heavy duty offset disk harrow of the type disclosed in copending U.S. application, Ser. No. 55,800, filed on July 17, 1970, D-9028, and comprises front and rear relatively angled disk gangs 10 and 11, respectively, carrying disks 12, the gangs being suspended from frame bars 13 and 14 and supported by two or more wheels, one of which is indicated at 15 in FIG. 1, and which are mounted on the frame bars by means well known in the art, not shown, for raising the implement for transport. As will be observed in FIG. 1, disks 12 of the front gang face to the right of the direction of travel and those of the rear gang face to the left. Each gang comprises a central section 16 and wing sections 17, a hitch structure 18 being provided for connecting the implement to a tractor.

Gangs 10 and 11 and the wing folding mechanisms therefor are substantial duplicates, and it may be noted that the central section 16 of front gang 10 comprises a transverse horizontal beam 19, rectangular in section, upon which a plurality of the disks 12 are mounted. FIGS. 2 to 7 show a portion of the forward central section 16 and one wing section 17 and illustrate the manner in which the wing section is swung from its extended operating position to its folded inoperative position.

As shown in FIG. 1, power transmission means for simultaneously raising or lowering the wings 17 is provided in the form of a double ended hydraulic cylinder 20 centrally mounted on beam 19 and having piston rods 21 slidable in opposite ends thereof for transmitting power to simultaneously fold both wing sections 17. Forming an extension of each rod 21 is a thrust link 22 pivotally connected at one end to rod 21 and carrying near its outer end a first pivot pin 23. Thrust link 22 comprises spaced link elements 24 diverging beyond pin 23 and carrying at their ends coaxial second pivot pins 25 functioning as a single pivot and spaced from first pin 23. Thrust link 22 is supported in the extension and retraction strokes of rod 21 in cylinder 20 by a support and guide stand 26 affixed to and projecting upwardly from beam 19 and having a recess 27 therein to slidably receive and confine link 22.

Wing section 17 is pivotally connected to the end of central section 16 by means of a hinge pin 28 carried at the upper ends of brackets 29 secured to the sides of beam 19, a sleeve 30 being mounted on pin 28 between the brackets. A centrally disposed lug 31 projecting upwardly from supporting beam 32 of wing section 17, is affixed medially of its ends to sleeve 30 and is slidably received between elements 24 of thrust link 22. Lug 31 forms part of arm means generally designated at 33 by which the linear motion of rod 21 and thrust line 22 is converted to rotary motion of wing section 17 about the axis of hinge pin 28.

Arm means 33 also includes a pair of plate members 34, each of which is mounted at its lower end on wing beam 32 by a pair of bolts 35 and 36, bolt 36 being received in a slot 37 in plate 34, accommodating limited rocking movement of plates 34 relative to lug 31 about the axis of bolts 35 for a purpose which will hereinafter become clear.

Pivot pin 23 carried by thrust link 22 and extending between the link elements 24 is slidably received in an arcuate slot 38 formed in lug 31, and the upper and lower ends of slot 38, as viewed in the positions of FIGS. 4 and 5 with wing section 17 in its operating position in horizontal alignment with central section 16, are designated "A" and "B," respectively.

In aligned plate members 34 are formed registering slots 39 the upper and lower ends of which, in the position of FIGS. 4 and 5, are designated "C" and "D," respectively, and as will be observed from the drawings the chords of the arcs defined by slots 38 and 39 are disposed in intersecting planes.

In the operating position of the wing section 17 shown in FIG. 4, pins 23 and 25 are displaced somewhat from the upper ends of the respective slots 38 and 39. Lost motion is provided in the mounting of plates 34 on beam 32 in the form of the slots 37 receiving bolts 36. In the operating position of FIG. 4, also observed in FIG. 2, beam 32 of wing section 17 is locked to beam 19 of the central section, plates 34 serving as latch means by the formation thereon of hook portions 40 cooperable with mating hook portions 41 formed on brackets 29.

Cylinder 20 is supplied with fluid under pressure by well-known means from the tractor, not shown, and, upon actuation of the cylinder to initiate the retraction stroke of piston rods 21 to fold the wings, pins 25, moving to the upper ends of slots 39, rock plates 34 clockwise about the axis of each bolt 35 within the limits of slots 37, while pin 23 moves to the adjacent end of its slot 38. Lug 31 and plates 34 now function as a unitary rock arm, and upon continued retraction of the piston rods, wing section 17 at each end of central section 16 swings upwardly about the axis of its hinge pin 28.

Figure 6:
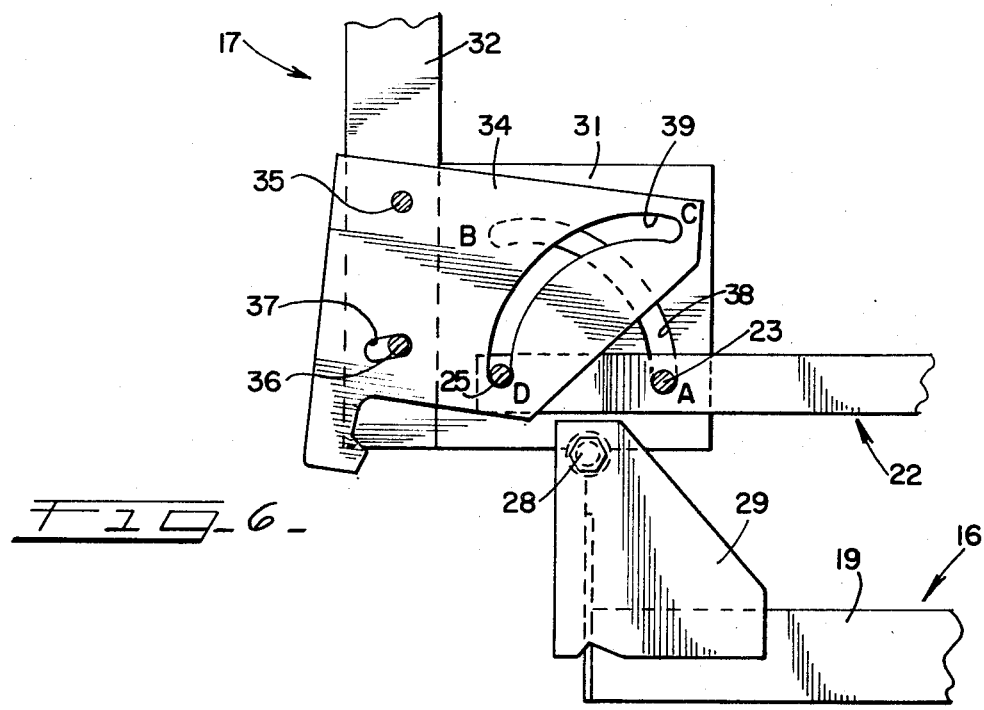
FIG. 6 is a view similar to FIGS. 4 and 5 after the wing has pivoted 90° about its hinge axis.

Thrust, through the first portion of the cylinder stroke is transmitted through the first pivot pin 23 engaging the end "A" of its slot, while pin 25 follows the arcuate path if its slot until, after swinging movement of the wing section about the axis of hinge pin 28 approximately 90°, as viewed in FIG. 6, pin 25 has moved from end "C" of its slot 39 to the other end "D" thereof. Upon further retraction of the piston rods, thrust is transmitted through pins 23 and 25 to pivot the wing the remaining 90° to complete the folding operation, while pin 23 follows the arcuate path of its slot 38 to the opposite end "B" thereof, and wing beam 32 comes to rest upon the upper end of guide member 26.

Figure 7:
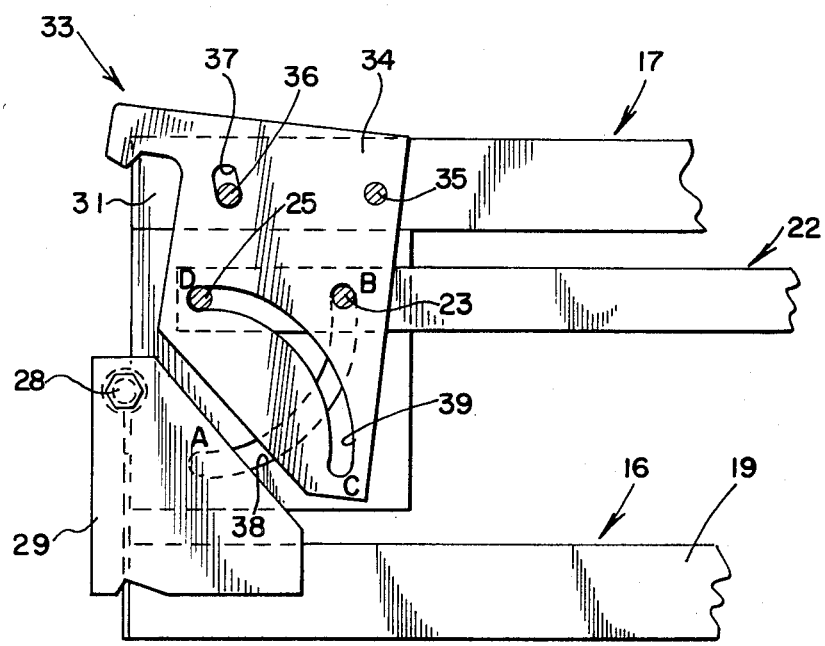
FIG. 7 shows the relationship of parts after the wing section has swung 180° to its folded position.

The reverse procedure follows actuation of the cylinder to extend rod 21 and thrust link 22 to pivot the wing section counterclockwise from the folded position of FIG. 7 to return it to its operating position as viewed in FIG. 5. It may be noted that, upon reaching the position of FIG. 5 the wing section is in operating alignment with the central section and pins 23 and 25 are at the upper ends of their respective slots, and bolt 36 is at the upper end of its slot 37. The final stroke of the cylinder now exerts thrust through pins 25 to rock plates 34 counterclockwise about the axis of bolt 35 to engage latch hooks 40 and 41 and lock the wing section in place.

It is believed that the construction and operation of the novel mechanism for folding harrow wing gangs will be clearly understood from the foregoing description. It may be further noted that the wings of the front and rear gangs are moved simultaneously between their operating and folding positions by simultaneous actuation of both cylinders 20.

What is claimed is:

1. In an implement having a central section and a folding wing section, hinge means pivotally connecting said sections, and means for swinging the wing section about the axis of said hinge means between operating and folded inoperative positions of the wing section comprising, power transmission means supported by said central section and having extension and retraction strokes, arm means mounted on said wing section having a pair of arcuate slots formed therein, spaced pin means carried by said power transmission means and slidably receivable in the respective of said slots, each of said pin means being pivotally disposed in one end of its associated slot in one of said positions of the wing section, said slots being so arranged that one of said pin means is effective by engaging an end of its slot and the other of said pin means is ineffective by sliding in its slot to transmit the power of said power transmission means to said arm means during a first portion of one of the strokes of said power transmission means to swing said wing section about the axis of said hinge means in one direction, said other of said pin means being effective by engaging an end of its slot and said one of said pin means being ineffective by sliding in its slot to transmit the power of said power transmission means to said arm means during the remainder of said one of the strokes of said power transmission means to swing the wing section to the other of said positions thereof.

2. The invention set forth in claim 1, wherein said one of said pin means is disposed at one end of its slot in thrust transmitting relation to said arm means during said first portion of said one of said strokes of said power transmission means while the other of said pin means is slidable to the other end of its slot in response to the rotation of the wing section about the axis of said hinge means, said other of said pin means being disposed at said other end of its slot in thrust transmitting relation to said arm means during the remainder of said stroke of the power transmission means while said one of said pin means is slidable to the other end of its slot in response to the continued rotation of the wing section about the axis of said hinge means.

3. The invention set forth in claim 2, wherein the chords of the arcs defined by said slots are disposed in intersecting planes.

4. The invention set forth in claim 3, wherein said power transmission means is a hydraulic cylinder mounted on said central section and having a piston rod reciprocable therein operatively connected to said arm means.

5. The invention set forth in claim 4, wherein, in its operating position said wing section is in alignment with said central section and is swingable about the axis of said hinge means, in response to the retraction stroke of said cylinder, to the folded inoperative position of said wing section generally parallel to said central section.

6. The invention set forth in claim 5, wherein, during said first portion of said stroke said wing section is swung approximately 90° about the axis of said hinge means and an additional 90° during the remainder of said stroke.

7. The invention set forth in claim 6, wherein said power transmission means includes a thrust link connected at one end to said piston rod and at its other end to said arm means and a guide member is mounted on said central section to support and guide said link, said wing section being engageable with said guide member in the folded position of said wing section.

8. The invention set forth in claim 7, wherein said arm means comprises a lug affixed to said wing section having one of said slots formed therein, plate means being mounted on the wing section and having the other of said slots formed therein, said pin means being carried by said thrust link and receivable in the respective of said slots.

9. The invention set forth in claim 8, wherein one of said pin means is carried by said thrust link for reception in the slot in said lug, said thrust link comprising a pair of elements diverging beyond said one of said pin means to provide a pair of ends, the other of said pin means comprising a pair of pins carried by said ends and said plate means comprising a pair of plate members mounted on said wing section on opposite sides of said lug and having registering slots therein to receive said other pins.

10. The invention set forth in claim 9, wherein a pair of brackets are affixed to the outer end of said central section and said hinge means comprises a hinge pin carried by said brackets and pivotally connected to said lug.

11. The invention set forth in claim 10, wherein the means for mounting said plate members on said wing section includes lost motion means accommodating limited rocking movement of said plate members relative to said lug, said plate members having latch means formed thereon cooperable with said brackets in the operating position of said wing section to lock the latter to said central section.

12. The invention set forth in claim 11, wherein the arrangement of said pins in said slots is such that, upon initiation of the retraction stroke of said cylinder to swing the wing section to its folded position said plate members are rocked relative to said lug to release said latch means.

* * * * *